United States Patent Office 2,996,527
Patented Aug. 15, 1961

2,996,527
REACTION PRODUCTS OF BIS(POLYFLUORO-ALKYL) ACETYLENES WITH PHOSPHORUS, ARSENIC AND ANTIMONY
Carl George Krespan, Wilmington, Del., assignor to E. I. du Pont de Nemours and Company, Wilmington, Del., a corporation of Delaware
No Drawing. Filed June 26, 1959, Ser. No. 823,009
15 Claims. (Cl. 260—440)

This invention relates to new, highly fluorinated, unsaturated heterocyclic compounds. More particularly, it relates to bridged bicyclic compounds having hetero atoms at the bridgehead positions, highly fluorinated substituents on all ring carbon atoms and intracyclic unsaturation.

Polycyclic compounds having hetero atoms as the bridgeheads are rare. No such compounds containing three ethylenic bridges appear to be known, nor are there any reports in the literature of compounds of this type having fluorinated substituents. The new compounds made available by this invention represent a wholly new class of chemicals.

In the description which follows, the term "polyfluoroalkyl" will be used for the sake of brevity to denote an alkyl group containing only carbon and fluorine and, optionally, one and only one other atom, which can be hydrogen or chlorine, this single atom, when the polyfluoroalkyl group has more than one carbon atom, being attached to the omega-carbon atom. Thus the term "polyfluoroalkyl" as used here includes perfluoroalkyl, ω-hydroperfluoroalkyl and ω-chloroperfluoroalkyl.

The new products made available by this invention are bicyclic bridged compounds composed of two six-membered rings having four atoms in common, wherein the ring members of the bicyclic bridged compounds are six carbon atoms and two hetero atoms, the latter occupying the two bridgehead positions and being elements of group V–A of the periodic table having atomic number from 15 to 51 (i.e., phosphorus, arsenic and antimony), and wherein each of the six ring carbon atoms is doubly bonded to another ring carbon atom and bears a polyfluoroalkyl substituent, i.e., a perfluoroalkyl, ω-hydroperfluoroalkyl or ω-chloroperfluoroalkyl substituent.

These compounds are represented by the general formula

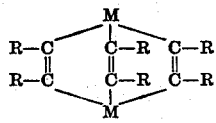

wherein M is an element of group V–A of the periodic table having atomic number from 15 to 51 (phosphorus, arsenic or antimony) and the R's, which may be alike or different, are perfluoroalkyl, ω-hydroperfluoroalkyl or ω-chloroperfluoroalkyl radicals. These compounds are therefore generically named 2,3,5,6,7,8-hexakis(polyfluoroalkyl)-1,4-diphospha(or diarsena, or distibia)bicyclo [2.2.2]octa-2,5,7-trienes.

The invention also includes a process for preparing the above-defined compounds which comprises maintaining in contact at a temperature of at least 150° C., and until the heterocyclic compound has formed, a mixture of an element of group V–A of the periodic table having atomic number from 15 to 51 with a bis(polyfluoroalkyl)acetylene of the formula R—C≡C—R, wherein the R's, which can be alike or different, are perfluoroalkyl, ω-hydroperfluoroalkyl or ω-chloroperfluoroalkyl radicals, which can be of any chain length but generally have not more than 12 carbon atoms, and preferably from 1 to 6 carbon atoms. Still more preferably, the bis(polyfluoroalkyl)-acetylenes are bis(perfluoroalkyl)acetylenes in which the perfluoroalkyl radicals have from 1 to 6 carbon atoms.

The bis(polyfluoroalkyl)acetylenes which serve as starting materials are obtainable as follows: The bis(perfluoroalkyl)acetylenes may be prepared by the process described in U.S. Patent 2,546,997. The bis(ω-hydroperfluoroalkyl)acetylenes can be prepared by reacting an ω-hydroperfluorocarboxylic acid chloride with 1,1-dichloro-2,2-difluoroethylene at 140–150° C. in the presence of nickel carbonyl catalyst, whereby carbon monoxide and chlorine are removed from the acid chloride and addition takes place to give an α,α'-dichloro-ω,ω'-dihydroperfluoroalkene of the formula $$H(CF_2)_nCF_2CCl=CClCF_2(CF_2)_nH$$

On removal of chlorine from the dichloroolefin, e.g., by treatment with magnesium in tetrahydrofuran or with zinc in acetic anhydride, there is obtained the bis(ω-hydroperfluoroalkyl)acetylene, $$H(CF_2)_nCF_2—C≡C—CF_2(CF_2)_nH$$

The first member of this series of compounds, bis(difluoromethyl)acetylene, is described in U.S. Patent 2,558,875.

The bis(ω-chloroperfluoroalkyl)acetylenes are prepared from the α,α,α,ω-tetrachloroperfluoroalkanes of the type $Cl(CF_2)_nCCl_3$, which are themselves made by telomerization of tetrafluoroethylene with carbon tetrachloride. Upon treatment with copper or with zinc activated with copper in ether, the α,α,α,ω-tetrachloroperfluoroalkane couples with loss of chlorine to yield the corresponding tetrachloroperfluoroolefin,

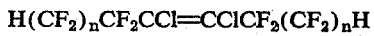

The tetrachloroperfluoroolefin is then dehalogenated by treatment with zinc in acetic anhydride to give the bis(ω-chloroperfluoroalkyl)acetylene, $$Cl(CF_2)_nC≡C(CF_2)_nCl$$

The first member of this series of compounds, bis(chlorodifluoromethyl)acetylene, is described in U.S. Patent 2,522,566.

Typical reactants suitable for use in the present invention include hexafluorobutyne-2, $CF_3—C≡C—CF_3$;
octafluoropentyne-2, $CF_3—C≡C—CF_2—CF_3$;
perfluorohexyne-3, $CF_3—CF_2—C≡C—CF_2—CF_3$;
perfluorohexyne-2, $CF_3—C≡C—CF_2—CF_2—CF_3$;
perfluorononyne-2, $CF_3—C≡C—(CF_2)_5—CF_3$;
perfluoropentadecyne-2, $CF_3—C≡C(CF_2)_{11}—CF_3$;
bis(difluoromethyl)acetylene, $HCF_2—C≡C—CF_2H$;
bis(ω-hydroperfluoroundecyl)acetylene, $$H(CF_2)_{11}—C≡C(CF_2)_{11}H$$

bis(chlorodifluoromethyl)acetylene, $ClCF_2C≡CCF_2Cl$;
bis(ω-chloroperfluorohexyl)acetylene, $$Cl(CF_2)_6C≡C(CF_2)_6Cl$$

bis(ω-chloroperfluorododecyl)acetylene, $$Cl(CF_2)_{12}C≡C(CF_2)_{12}Cl$$

and the like.

Among the heterocyclic compounds which can be obtained by the process of this invention, the following may be mentioned, in addition to those illustrated in the detailed examples which follow:

2,5,7-tris(trifluoromethyl) - 3,6,8 - tris(perfluoroethyl)-1,4-diphosphabicyclo[2.2.2]octa-2,5,7-triene.

2,3,5,6,7,8-hexakis(perfluoroethyl)-1,4-diarsenabicyclo[2.2.2]octa-2,5,7-triene.

2,5,7 - tris(trifluoromethyl)-3,6,8-tris(perfluoropropyl)-1,4-diphosphabicyclo[2.2.2]octa-2,5,7-triene.

2,5,7-tris(trifluoromethyl) - 3,6,8 - tris(perfluorohexyl)-1,4-diarsenabicyclo[2.2.2]octa-2,5,7-triene.

2,5,7-tris(trifluoromethyl)-3,6,8-tris(perfluorododecyl)-1,4-diphosphabicyclo[2.2.2]octa-2,5,7-triene.

2,3,5,6,7,8 - hexakis(perfluoroethyl)-1,4-distibiabicyclo[2.2.2]octa-2,5,7-triene.

2,3,5,6,7,8-hexakis(perfluorohexyl) - 1,4 - diphosphabicycla[2.2.2]octa-2,5,7-triene.

2,3,5,6,7,8-hexakis(difluoromethyl) - 1,4 - diphosphabicycla[2.2.2]octa-2,5,7-triene.

2,3,5,6,7,8 - hexakis(ω - hydroperfluoropropyl - 1,4 - diphosphabicyclo[2.2.2]octa-2,5,7-triene.

2,3,5,6,7,8-hexakis(ω-hydroperfluoropentyl) - 1,4 - diarsenabicyclo[2.2.2]octa-2,5,7-triene.

2,3,5,6,7,8-hexakis(ω-hydroperfluoroundecyl) - 1,4 - diphosphabicyclo[2.2.2]octa-2,5,7-triene.

2,3,5,6,7,8-hexakis(chlorodifluoromethyl) - 1,4 - distibiabicyclo[2,2,2]octa-2,5,7-triene.

2,3,5,6,7,8 - hexakis(ω - chloroperfluoroethyl) - 1,4 - diphosphabicyclo[2.2.2]octa-2,5,7-triene.

2,3,5,6,7,8 - hexakis(ω - chloroperfluorohexyl) - 1,4 - diphosphabicyclo[2.2.2]octa-2,5,7-triene.

2,3,5,6,7,8-hexakis(ω-chloroperfluorododecyl)-1,4-diarsenabicyclo[2.2.2]octa-2,5,7-triene.

When the starting bis(polyfluoroalkyl)acetylene is unsymmetrical, i.e., when the polyfluoroalkyl groups attached to the triply bonded carbon atoms are different, position isomers, as well as geometrical isomers, are possible in the resulting heterocyclic structures, since the respective polyfluoroalkyl groups can be attached to either of the adjacent carbon atoms in each pair of doubly bonded carbon atoms in these structures.

The most accessible of these heterocyclic compounds are those in which the polyfluoroalkyl groups have from 1 to 12 carbon atoms, and preferably from 1 to 6 carbon atoms. Still more preferably, the polyfluoroalkyl groups are perfluoroalkyl groups of 1 to 6 carbon atoms, and the hetero atom is phosphorus.

The reaction between the bis(polyfluoroalkyl)acetylene and the element (phosphorus, arsenic or antimony) is impractically slow at temperatures below about 150° C. It is therefore desirable to heat the reactants to at least that temperature. The temperature can be as high as desired below the decomposition point of the reactants and reaction products, but in general it is unnecessary to exceed about 400° C., the preferred range of reaction temperature being that between 150 and 300° C. The reaction can be carried out in sealed vessels, preferably agitated, under the autogenous pressure developed at the temperature used, or, if desired, under higher pressures from an inert gas, e.g., up to 5000 atmospheres. If the bis(polyfluoroalkyl)acetylene is sufficiently high boiling, the reaction can be carried out at or near atmospheric pressure under reflux, preferably in an inert atmosphere.

The reaction proceeds without the help of a catalyst, but it is considerably facilitated when iodine is present. Iodine can be used as the free element, in which case catalytic quantities of it are sufficient, e.g., between 0.005 and 0.1 mole per mole of phosphorus, arsenic or antimony. Alternatively, the iodine can be used in combined form, i.e., as its addition product with the bis (polyfluoroalkyl)acetylene. When this is done, all or part of the bis(polyfluoroalkyl)acetylene to be employed is first converted to its 1,2-diiodo derivative, i.e., the 1,2-bis(iodo)-1,2-bis(polyfluoroalkyl)ethylene R—CI=CI—R, where R is a polyfluoroalkyl group. This can readily be done by reacting the bis(polyfluoroalkyl)acetylene with elemental iodine. The iodine initially present in the reacting system, whether in elemental or combined form, is converted during the reaction chiefly to iodides of the element used, e.g., $P_2I_4$ and $PI_3$ with phosphorus and $AsI_3$ with arsenic.

The relative proportions of the two reactants are not critical. They are of importance only insofar as it is desired to utilize as completely as possible the more expensive organic reactant. For this reason, it is desirable, though by no means essential, to use the element (phosphorus, arsenic or antimony) in at least the stoichiometrical proportions, i.e., ⅔ mole of the element per mole of bis(polyfluoroalkyl)acetylene or its diiodo addition product. Preferably, the element is used in excess, for example up to 3 moles of it per mole of bis(polyfluoroalkyl)acetylene or its diiodo addition product.

When the element is capable of existing in several allotropic forms, such as phosphorus, any of these forms can be used in the process of this invention.

Appreciable amounts of heterocyclic compounds are formed within as short a time as 30 minutes or less at operating temperature when iodine is used as a catalyst, as such or in combined form. It is in general unnecessary to prolong the reaction period beyond two to ten hours, depending on the reaction temperature and the mutual reactivity of the reactants.

No solvent or diluent is necessary, but if desired there can be used an inert organic liquid medium, preferably one that dissolves the element to some extent, such as benzene or carbon disulfide.

The heterocyclic reaction products are solids or high-boiling liquids. They can be separated from the reaction mixture in various ways. For example, the organic compounds can be extracted from the elemental phosphorus, arsenic or antimony with the aid of a suitable organic solvent and the desired heterocyclic compound isolated from this solution by crystallization or by distillation of the more volatile components, including any unreacted bis(polyfluoroalkyl)acetylene. Another method consists in subliming the heterocyclic compound out of the reaction mass at ordinary or reduced pressure, since many of these compounds are sublimable. Yet other methods include direct distillation of the crude product under reduced pressure, or steam distillation.

The invention is illustrated in greater detail in the following examples.

*Example I*

A mixture of 6.2 g. (0.20 mole) of red phosphorus and 39.4 g. (0.095 mole) of 1,2-bis(iodo)-1,2-bis(trifluoromethyl)ethylene, $CF_3$—CI=CI—$CF_3$, was placed in an 80 ml. pressure tube lined with stainless steel. The tube was heated with agitation at 200° C. for 5 hours under the autogenous pressure of the reactants. The solid crude reaction product was subjected to slow sublimation at 65° C. and atmospheric pressure. After two days, 8.0 g. of a nearly colorless crystalline sublimate had been collected. After crystallization from benzene and resublimation at 100° C. and atmospheric pressure, this product was obtained as white crystals melting at 119° C. (sealed tube). It was identified by elemental analysis as 2,3,5,6,7,8 - hexakis(trifluoromethyl) - 1,4-diphosphabicyclo[2.2.2]octa-2,5,7-triene,

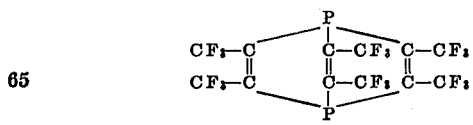

obtained in 46% conversion based on the 1-2-bis(iodo)-1,2-bis(trifluoromethyl)ethylene.

*Analysis.*—Calc'd for $C_{12}F_{18}P_2$: C, 26.30; F, 62.40; P, 11.31. Found: C, 26.91; F, 60.94; P, 10.81.

The same product, obtained in another preparation under similar conditions, was found by mass spectroscopy to have a molecular weight of 548 (calc'd.: 548) and to contain 27.03% C, 62.35% F, and 11.48% P.

The ultraviolet, infrared and nuclear magnetic resonance spectra of the product supported the assigned structure.

The 1,2-bis(iodo)-1,2-bis(trifluoromethyl)ethylene used as the starting material in this example can be prepared as follows:

A mixture of 48 g. (0.30 mole) of bis(trifluoromethyl)acetylene and 38.1 g. (0.15 mole) of iodine was heated at 200° C. for 11 hours in a bomb. Distillation of the reaction product gave 20 g. of 1,2-bis(iodo)-1,2-bis(trifluoromethyl)ethylene, B.P. 71–73° C. at 45 mm.

*Analysis.*—Calc'd for $C_4F_6I_2$: C, 11.55; F, 27.41; I, 61.03. Found: C, 11.85; F, 27.17; I, 60.41.

Nuclear magnetic resonance analysis showed that both cis and trans isomers were present.

Example II

A mixture of 12.4 g. (0.40 mole) of red phosphorus, 32 g. (0.20 mole) of bis(trifluoromethyl)acetylene and 2.5 g. (0.01 mole) of iodine was heated in an agitated bomb at 200° C. for 8 hours under the autogenous pressure of the reactants. The reaction product was shaken with mercury to remove the iodine, then heated briefly at 90° C. under 10 mm. pressure to remove a liquid fraction. The remainder was sublimed at 100° C. under a pressure gradually decreased from atmospheric to 10 mm. The sublimate (22.4 g.) was crystallized from benzene and resublimed to give 16.2 g. [45% conversion based on the bis(trifluoromethyl)acetylene] of 2,3,5,6,7,8-hexakis(trifluoromethyl) - 1,4 - diphosphabicyclo[2.2.2]octa-3,5,7-triene, M.P. 119° C.

Example III

A mixture of 30.0 g. (0.40 mole) of arsenic and 83.2 g. (0.20 mole) of 1,2-bis(iodo)-1,2-bis(trifluoromethyl)-ethylene was heated in an agitated bomb for 10 hours at 200° C. under the autogenous pressure of the reactants. The solid reaction product was then sublimed at 110–120° C. at atmospheric pressure. There was thus obtained 31.2 g. of a solid product which was further purified by recrystallization from chloroform, then from acetic acid, to give colorless crystals melting at 139–140° C. (sealed tube). This product was identified by elemental analysis as 2,3,5,6,7,8 - hexakis(trifluoromethyl) - 1,4 - diarsenabicyclo[2.2.2]octa-3,5,7-diene,

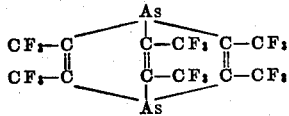

obtained in 44% conversion based on the 1,2-bis(iodo)-1,2-bis(trifluoromethyl)ethylene.

*Analysis.*—Calc'd for $C_{12}F_{18}As_2$: C, 22.66; F, 53.78; As, 23.56. Found: C, 22.90; F, 53.87; As, 24.40.

The ultraviolet, infrared and nuclear magnetic resonance spectra supported the assigned structure.

Example IV

A mixture of 28.9 g. (0.10 mole) of bis(ω-chlorotetrafluoroethyl)acetylene, $ClCF_2CF_2C{\equiv}CCF_2CF_2Cl$, 6.4 g. (0.20 mole) of red phosphorus and 12.7 g. (0.05 mole) of iodine was heated for 12 hours at 220° C. in an agitated bomb under autogenous pressure. A preliminary distillation of the reaction product gave a distillate, B.P. 90–120° C. at 1 mm., consisting of a mixture of oil and solid. This distillate was stirred with four 50 ml. portions of water, then redistilled. A fraction boiling at 120–128° C. at 0.4 mm. was obtained as a mixture of oil and solid. From this fraction was obtained by two recrystallizations from methylene chloride a colorless crystalline solid, M.P. 114–115° C., which was identified by infrared and nuclear magnetic resonance analysis as 2,3,5,6,7,8-hexakis(ω - chlorotetrafluoroethyl) - 1,4 - diphosphabicyclo [2.2.2]octa-3,5,7-diene,

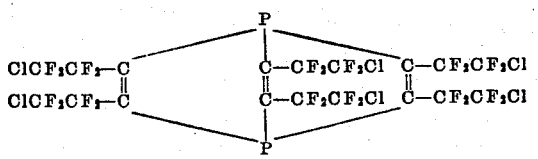

The bis(ω-chlorotetrafluoroethyl)acetylene used as the starting material in this example was prepared as follows:

(A) A mixture of 187 g. 1,3,3,3-tetrachloro-1,1,2,2-tetrafluoropropane [which can be prepared as described by Coffman et al. in J. Am. Chem. Soc. 71, 979 (1949)] and 114 g. of copper powder was heated in an agitated bomb at 180° C. for 15 hours. The reaction product was extracted continuously with methylene chloride for 10 hours. Distillation of the extract gave 88 g. of 1,3,4,-6 - tetrachloro - 1,1,2,2,5,5,6,6 - octafluoro - 3 - hexene, $ClCF_2CF_2CCl{=}CClCF_2CF_2Cl$, B.P. 95–98° C. at 100 mm.

*Analysis.*—Calc'd for $C_6Cl_4F_8$: Cl, 31.77; F, 41.54. Found: Cl, 31.49; F, 41.55.

(B) A flask fitted with a stirrer, a dropping funnel and a short distilling column was charged with 20 g. of zinc dust and 60 ml. of acetic anhydride. The mixture was heated until the head temperature reached 135° C., and then a solution of 44.2 g. of $$ClCF_2CF_2CCl{=}CClCF_2CF_2Cl$$

in 20 ml. of acetic anhydride was added in small portions over a period of 4 hours. During this time the reaction product was removed continuously at a head temperature of 83–93° C. There was obtained 36.5 g. of colorless distillate which was washed with water, 5% sodium bicarbonate and again with water to remove co-distilled acetic anhydride. After drying over sodium sulfate, the product was distilled, giving 25 g. of bis(ω-chlorotetrafluoroethyl)acetylene, B.P. 82–84° C., $n_D^{24}$ 1.3210.

*Analysis.*—Calc'd for $C_6Cl_2F_8$: C, 24.43; Cl, 24.04; F, 51.53. Found: C, 25.24; Cl, 24.44; F, 51.61.

The infrared and nuclear magnetic resonance spectra supported the assigned structure.

This invention provides a convenient and satisfactory process for preparing in one step heterocyclic compounds having an unusual and entirely novel structure. The compounds thus made available have unexpected properties. Even though they belong to a normally highly reactive class (the tertiary phosphines, arsines and stibines) they are characterized by a relatively high degree of physical and chemical inertness. For example, the heterocyclic products of this invention are thermally stable and they are stable towards air, hot dilute nitric acid, cold aqueous ammonia, and cold aqueous alkalies. Their low basicity is shown by the fact that they can be crystallized unchanged from acetic acid. They do not react under moderate conditions with methyl iodide or benzyl chloride, nor do they absorb bromine from cold carbon tetrachloride solution. While these compounds burn weakly in a flame, they do not support combustion and the fire goes out when the flame is removed.

These compounds as a class are useful in various applications. For example, they are useful as inhibitors of free radical-initiated polymerization of polymerizable unsaturates, as shown by the following tests, carried out with freshly distilled, uninhibited vinyl acetate. In each test, a 3 ml. sample of the monomer was used. Test 1 was the control, i.e., nothing was added to the vinyl acetate. In tests 2, 3, and 4, 0.02 g. of α,α'-azobis-(α,α-dimethylvaleronitrile) was added as the polymerization initiator. In tests 2 and 3, 0.1 g. of the compounds of Examples I and III, respectively, was added as the polymerization inhibitor. In test 4, no inhibitor was added. All four samples were heated at 70° C. for 15 minutes, after which 1 ml. aliquots were taken from each sample and the time required for these aliquots to drain from the same pipette was determined, thus measuring the change in viscosity from the control. The results are recorded in the following table:

| Test No. | Composition | Flow Time, Seconds |
|---|---|---|
| 1 | Vinyl acetate alone | 3. |
| 2 | Vinyl acetate+catalyst+compound of Example I. | 3. |
| 3 | Vinyl acetate+catalyst+compound of Example II. | 3. |
| 4 | Vinyl acetate+catalyst | Set to glass. |

It will be seen from the above table that the heterocyclic compounds of this invention inhibit the catalyzed polymerization of vinyl acetate. The polymerization of other unsaturated monomers such as styrene or acrylonitrile is similarly inhibited.

The products of this invention are further useful as dielectric insulators and as stabilizers for halogenated polymers.

The phosphorus heterocyclics have the remarkable property of forming 1:1 molar adducts with diborane, $B_2H_6$. This adduct dissociates readily on warming to regenerate diborane. Thus, the phosphorus heterocyclics can be used to purify diborane and also to keep it in cold storage as an uninflammable solid, much easier to handle and manipulate than the spontaneously inflammable diborane itself.

What is claimed is:

1. A compound represented by the following structural formula:

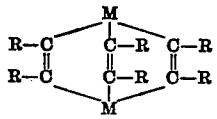

wherein M is an element selected from the group consisting of phosphorus, arsenic, and antimony, and each R contains from 1–12 carbon atoms and is selected from the group consisting of perfluoroalkyl, ω-hydroperfluoroalkyl and ω-chloroperfluoroalkyl radicals.

2. A process for making novel highly fluorinated unsaturated heterocyclic compounds which comprises heating at a temperature of at least 150° C. and not exceeding about 400° C., a mixture of an element selected from the group consisting of phosphorus, arsenic, and antimony with a compound of the formula R—C≡C—R wherein each R contains from 1–12 carbon atoms and is selected from the group consisting of perfluoroalkyl, ω-chloroperfluoroalkyl and ω-hydroperfluoroalkyl radicals.

3. The process of claim 2 wherein iodine is used as a catalyst.

4. 2,3,5,6,7,8 - hexakis(polyfluoroalkyl) - 1,4 - diphosphabicyclo[2.2.2]octa-2,5,7-trienes, wherein the alkyl group has from 1–12 carbon atoms.

5. 2,3,5,6,7,8 - hexakis(polyfluoroalkyl) - 1,4 - diarsenabicyclo[2.2.2]octa-2,5,7-trienes, wherein the alkyl group has from 1–12 carbon atoms.

6. 2,3,5,6,7,8 - hexakis(trifluoromethyl) - 1,4 - diphosphabicyclo[2.2.2]octa-2,5,7-triene.

7. 2,3,5,6,7,8 - hexakis(trifluoromethyl) - 1,4 - diarsenabicyclo[2.2.2]octa-3,5,7-triene.

8. A compound represented by the following structural formula

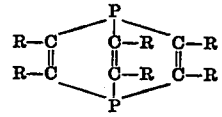

wherein R is perfluoroalkyl of from 1–12 carbon atoms.

9. A compound represented by the following structural formula

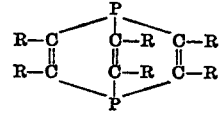

wherein R is ω-chloroperfluoroalkyl of from 1–12 carbon atoms.

10. A compound represented by the following structural formula

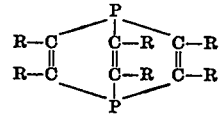

wherein R is ω-hydroperfluoroalkyl of from 1–12 carbon atoms.

11. A compound represented by the following structural formula

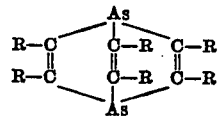

wherein R is perfluoroalkyl of from 1–12 carbon atoms.

12. A compound represented by the following structural formula

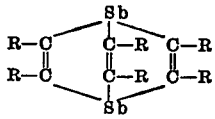

wherein R is perfluoroalkyl of from 1–12 carbon atoms.

13. A process for making novel, highly fluorinated unsaturated heterocyclic compounds which comprises heating at a temperature of at least 150° C. and not exceeding about 400° C., a mixture of phosphorus with a compound of the formula R—C≡C—R wherein R is perfluoroalkyl of from 1–12 carbon atoms.

14. A process for making novel, highly fluorinated unsaturated heterocyclic compounds which comprises heating at a temperature of at least 150° C. and not exceeding 400° C., a mixture of arsenic with a compound of the formula R—C≡C—R wherein R is perfluoroalkyl of from 1–12 carbon atoms.

15. A process for making novel, highly fluorinated unsaturated heterocyclic compounds which comprises heating at a temperature of at least 150° C. and not exceeding 400° C., a mixture of antimony with a compound of the formula R—C≡C—R wherein R is perfluoroalkyl of from 1–12 carbon atoms.

No references cited.